US012283776B2

(12) United States Patent
Evans et al.

(10) Patent No.: US 12,283,776 B2
(45) Date of Patent: Apr. 22, 2025

(54) ANGLED SUBASSEMBLY FOR AN ANGLED CONNECTOR

(71) Applicant: TE Connectivity Solutions GmbH, Schaffhausen (CH)

(72) Inventors: Nicholas Lee Evans, Middletown, PA (US); Kevin Stauffer, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 326 days.

(21) Appl. No.: 17/708,878

(22) Filed: Mar. 30, 2022

(65) Prior Publication Data

US 2023/0318231 A1 Oct. 5, 2023

(51) Int. Cl.

| | |
|---|---|
| ***H01R 13/6581*** | (2011.01) |
| ***H01R 13/6591*** | (2011.01) |
| ***H01R 13/6593*** | (2011.01) |
| ***H01R 43/048*** | (2006.01) |

(52) U.S. Cl.

CPC ... *H01R 13/6581* (2013.01); *H01R 13/65915* (2020.08); *H01R 13/6593* (2013.01); *H01R 43/048* (2013.01)

(58) Field of Classification Search

CPC .......... H01R 13/6581; H01R 13/65915; H01R 13/6593; H01R 43/048

USPC ........................................................ 439/607.5

See application file for complete search history.

(56) References Cited

U.S. PATENT DOCUMENTS

| | | | | |
|---|---|---|---|---|
| 4,173,386 A * | 11/1979 | Kauffman | H01R 24/564 | 439/582 |
| 5,362,255 A * | 11/1994 | Anhalt | H01R 9/0518 | 29/862 |
| 6,817,899 B1 * | 11/2004 | Zerebilov | H01R 9/0524 | 439/585 |
| 10,109,935 B2 * | 10/2018 | Kondo | H01R 24/54 | |
| 2004/0058582 A1 * | 3/2004 | Wendling | H01R 9/0518 | 439/582 |
| 2005/0282434 A1 * | 12/2005 | Morikawa | H01R 9/0518 | 439/578 |
| 2008/0188119 A1 | 8/2008 | Okamura et al. | | |
| 2008/0261445 A1 * | 10/2008 | Malloy | H01R 9/0524 | 439/578 |
| 2018/0090891 A1 * | 3/2018 | Schroll | H01R 13/631 | |

(Continued)

FOREIGN PATENT DOCUMENTS

| | | | |
|---|---|---|---|
| CA | 2644497 A1 * | 5/2008 | H01R 13/65912 |
| DE | 102004029300 A1 * | 1/2005 | H01R 24/40 |
| DE | 112015002005 B4 * | 3/2020 | H01R 13/658 |

(Continued)

OTHER PUBLICATIONS

Written Opinion of The ISA, PCT App. No US2023/016986 International Filing Date Mar. 30, 2022.

*Primary Examiner* — Peter G Leigh

(57) ABSTRACT

An angled subassembly of an angled connector includes an angled shield and a cable disposed in the angled shield. The angled shield has a first shield section and a second shield section extending at a bend angle with respect to the first shield section. The cable has a first portion positioned in the first shield section and a second portion positioned in the second shield section. The second portion extends at the bend angle with respect to the first portion.

19 Claims, 7 Drawing Sheets

(56) References Cited

U.S. PATENT DOCUMENTS

2018/0375233 A1 12/2018 Morello et al.

FOREIGN PATENT DOCUMENTS

| | | | | | |
|---|---|---|---|---|---|
| EP | 1249898 | A2 | * | 10/2002 | ........... H01R 13/641 |
| EP | 3379659 | A1 | * | 9/2018 | ............. H01R 13/02 |
| WO | WO-2015164090 | A2 | * | 10/2015 | ........... H01R 13/658 |

* cited by examiner

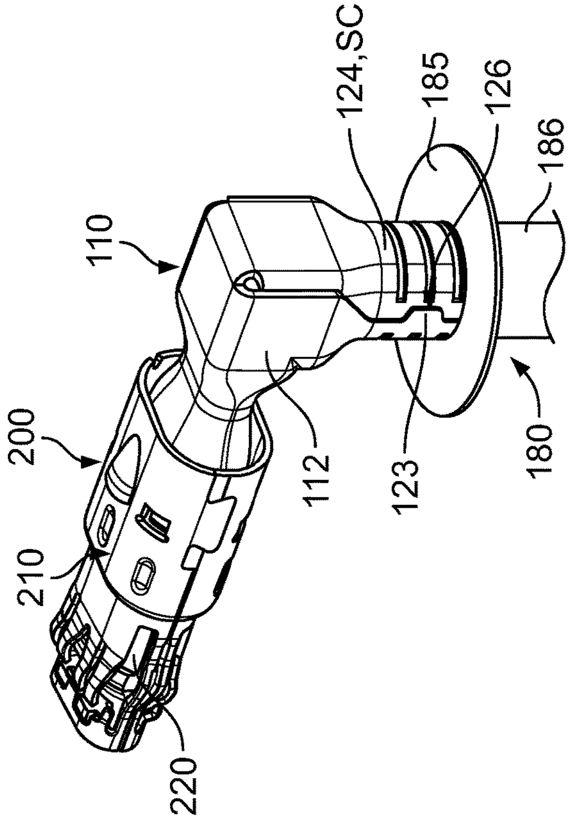
Fig. 4E
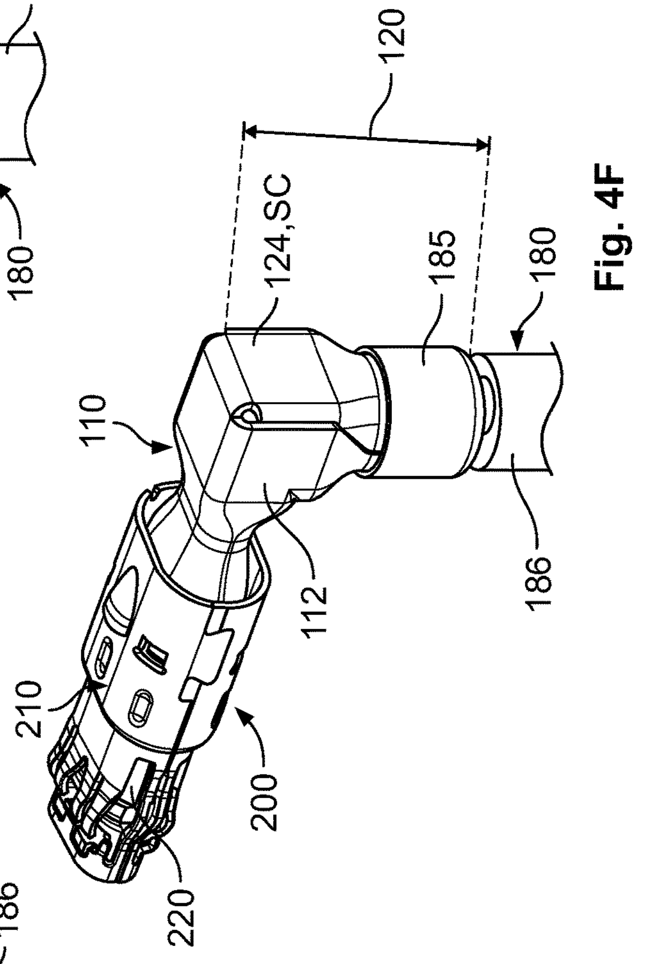
Fig. 4F
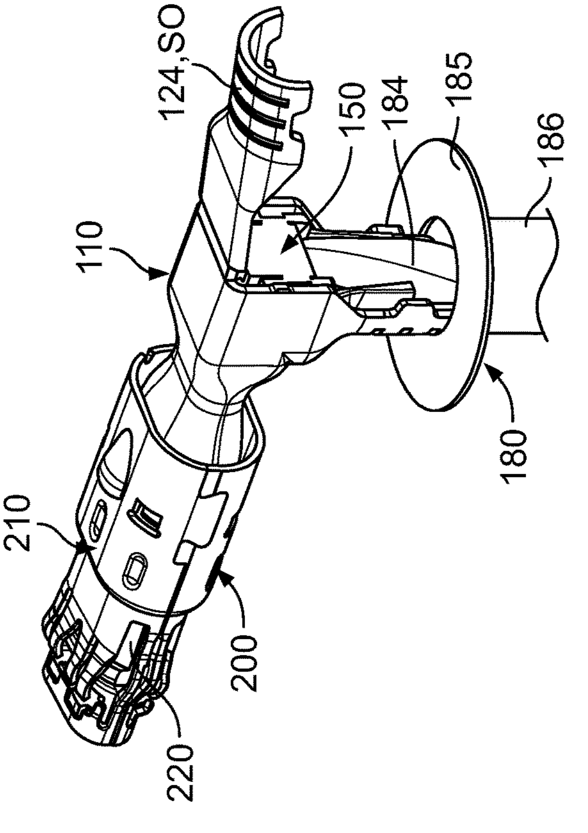
Fig. 4D
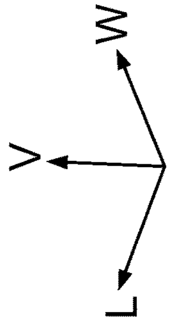

ANGLED SUBASSEMBLY FOR AN ANGLED CONNECTOR

FIELD OF THE INVENTION

The present invention relates to a subassembly of a connector and, more particularly, to an angled subassembly for an angled connector.

BACKGROUND

An angled connector commonly includes a housing, contacts disposed within the housing, a shield disposed around the housing, and a cable disposed within the housing and electrically connected to the contacts. Angled connectors are used in applications in which the contacts of the connector are required to be disposed at an angle with respect to a direction in which the cable extends into the connector.

The cable extends in a single direction into the angled connector and the contacts disposed within the housing have a bend forming the angle desired for the angled connector. The contacts can be formed in a single piece and subsequently bent to the desired angle or can be formed in multiple pieces that are attached to one another to form the desired angle. These arrangements of the contacts, however, result in high component cost, complicated assembly, inconsistent formation of the necessary angles, and difficult impedance control.

SUMMARY

An angled subassembly of an angled connector includes an angled shield and a cable disposed in the angled shield. The angled shield has a first shield section and a second shield section extending at a bend angle with respect to the first shield section. The cable has a first portion positioned in the first shield section and a second portion positioned in the second shield section. The second portion extends at the bend angle with respect to the first portion.

BRIEF DESCRIPTION OF THE DRAWINGS

The invention will now be described by way of example with reference to the accompanying Figures, of which:

FIG. 4D is a perspective view of the cable with the angled dielectric in the angled shield, with a shield cover of the angled shield in an open shield position;

FIG. 4E is a perspective view of the cable in the angled shield with the shield cover in a closed shield position;

FIG. 4F is a perspective view of the cable in the angled shield with the shield cover in the closed shield position and a braid of the cable disposed over a first shield section of the angled shield;

DETAILED DESCRIPTION OF THE EMBODIMENT(S)

Figure 1:
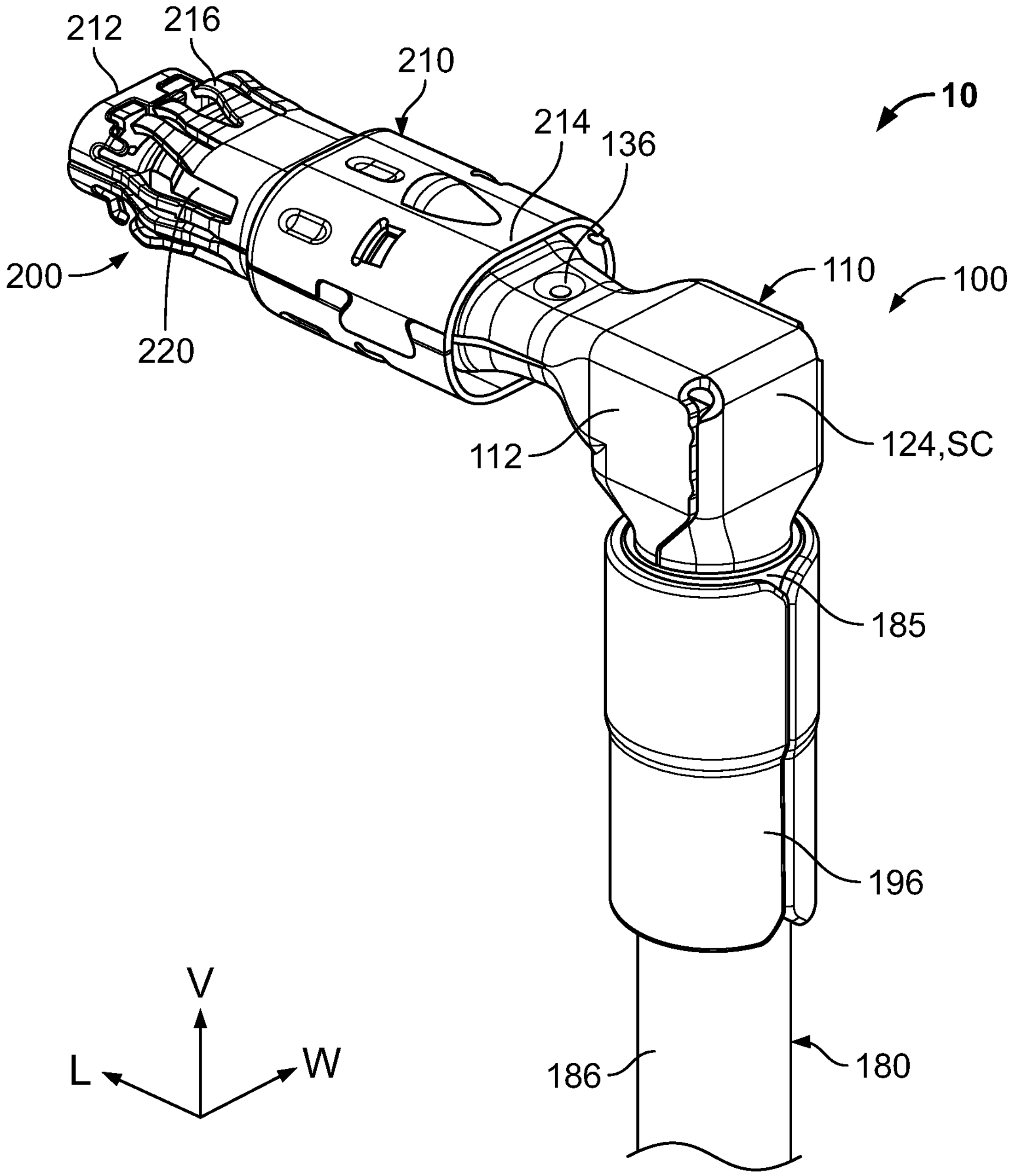
FIG. 1 is a perspective view of an angled connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "longitudinal", "width", and "vertical". These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

An angled connector 10 according to an embodiment, as shown in FIG. 1, includes an angled subassembly 100 and a mating subassembly 200 connected to the angled subassembly 100.

The angled subassembly 100, as shown in FIGS. 1, 2, 5, and 6, includes an angled shield 110, an angled dielectric 150 disposed in the angled shield 110, a cable 180 disposed in the angled shield 110, a contact 190 electrically connected to the cable 180, and a ferrule 196 disposed around the cable 180 and the angled shield 110.

Figure 3:
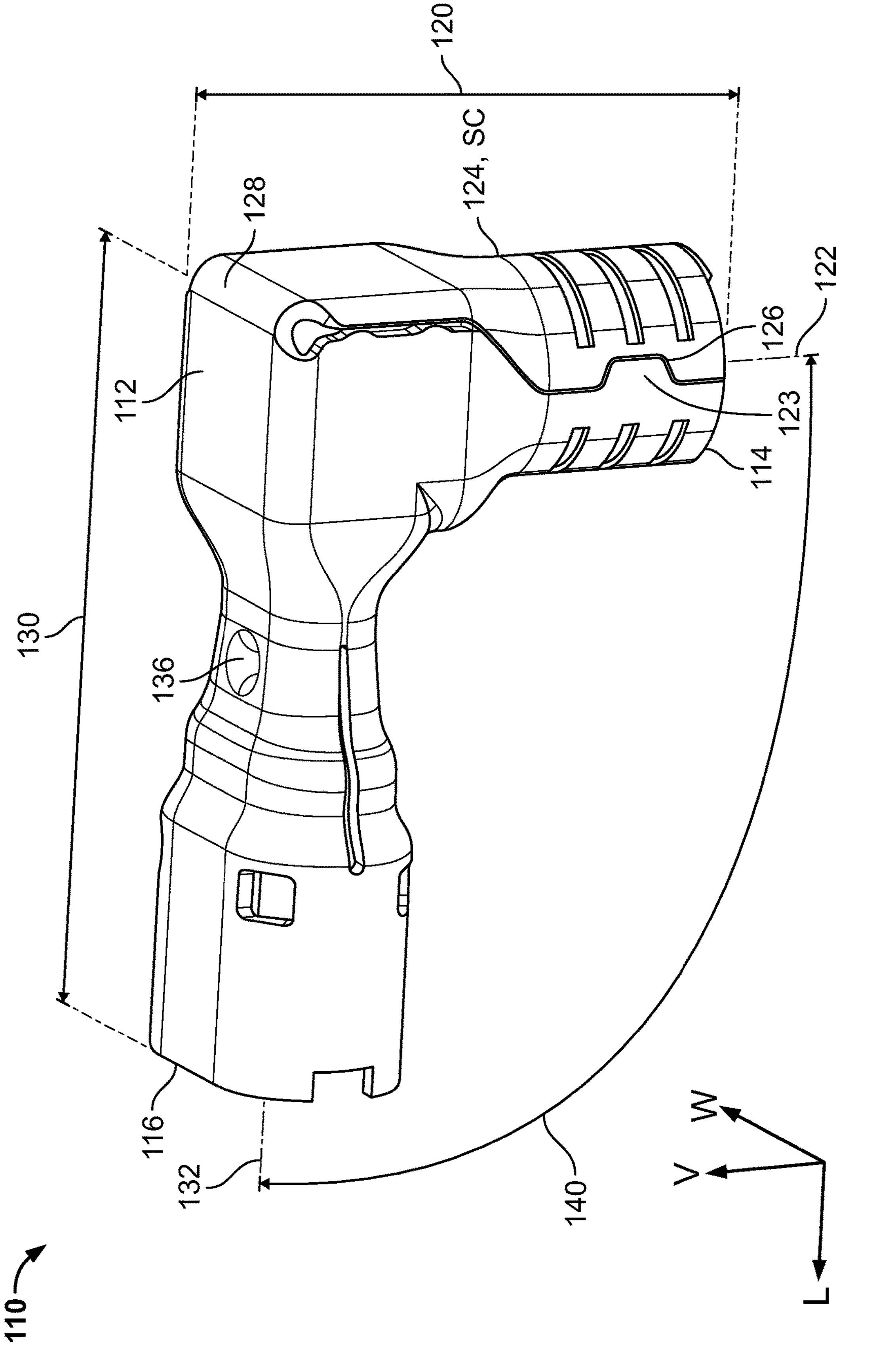
FIG. 3 is a perspective view of an angled shield of the angled connector.

As shown in FIG. 3, the angled shield 110 has a shield body 112 extending from a first end 114 to an opposite second end 116. The angled shield 110 has a first shield section 120 and a second shield section 130 extending from the first shield section 120.

The first shield section 120, as shown in FIG. 3, extends from the first end 114 of the shield body 112. The first shield section 120 has a first shield axis 122 extending centrally through the first shield section 120. In the shown embodiment, the first shield axis 122 extends along a vertical direction V.

The second shield section 130 extends from the first shield section 120 to the second end 116 of the shield body 112, as shown in FIG. 3. The second shield section 120 has a second shield axis 132 extending centrally through the second shield section 120. In the shown embodiment, the second shield axis 132 extends along a longitudinal direction L perpendicular to the vertical direction V.

As shown in FIG. 3, due to the direction of extension of the second shield axis 132 with respect to the first shield axis 122, the second shield section 130 extends at a bend angle 140 with respect to the first shield section 120. In the shown embodiment, the bend angle 140 is 90° and the second shield section 130 extends perpendicularly with respect to the first shield section 120. In other embodiments, the bend angle

140 can be any angle greater than 90° and less than 180°, and the second shield section 130 can extend at angles between 90° and 180° with respect to the first shield section 120.

Figure 2:
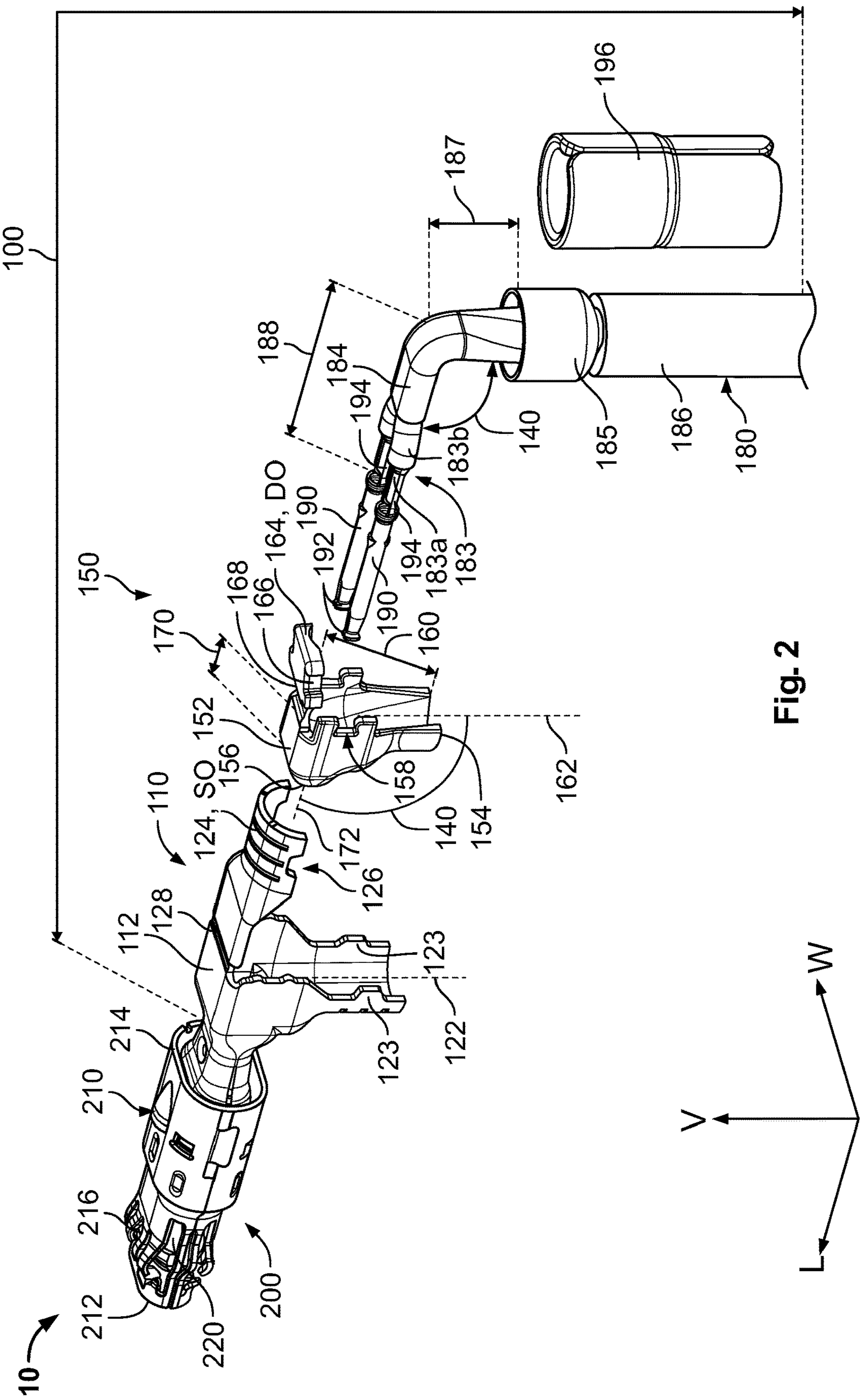
FIG. 2 is an exploded perspective view of the angled connector.

In the first shield section 120, as shown in FIGS. 2 and 3, the angled shield 110 has a shield cover 124 attached to the shield body 112 at a shield hinge 128. The shield cover 124 is pivotable with respect to the shield body 112 about the shield hinge 128 between an open shield position SO, shown in FIG. 2, and a closed shield position SC, as shown in FIG. 3. In the embodiment shown in FIGS. 2 and 3, the shield body 112 has a tab 123 in the first shield section 120 and the shield cover 124 has a recess 126 extending into the shield cover 124. When the shield cover 124 is pivoted into the closed shield position SC, as shown in FIG. 3, the tab 123 enters the recess 126 and secures the shield cover 124 in the closed shield position SC.

Figure 5:
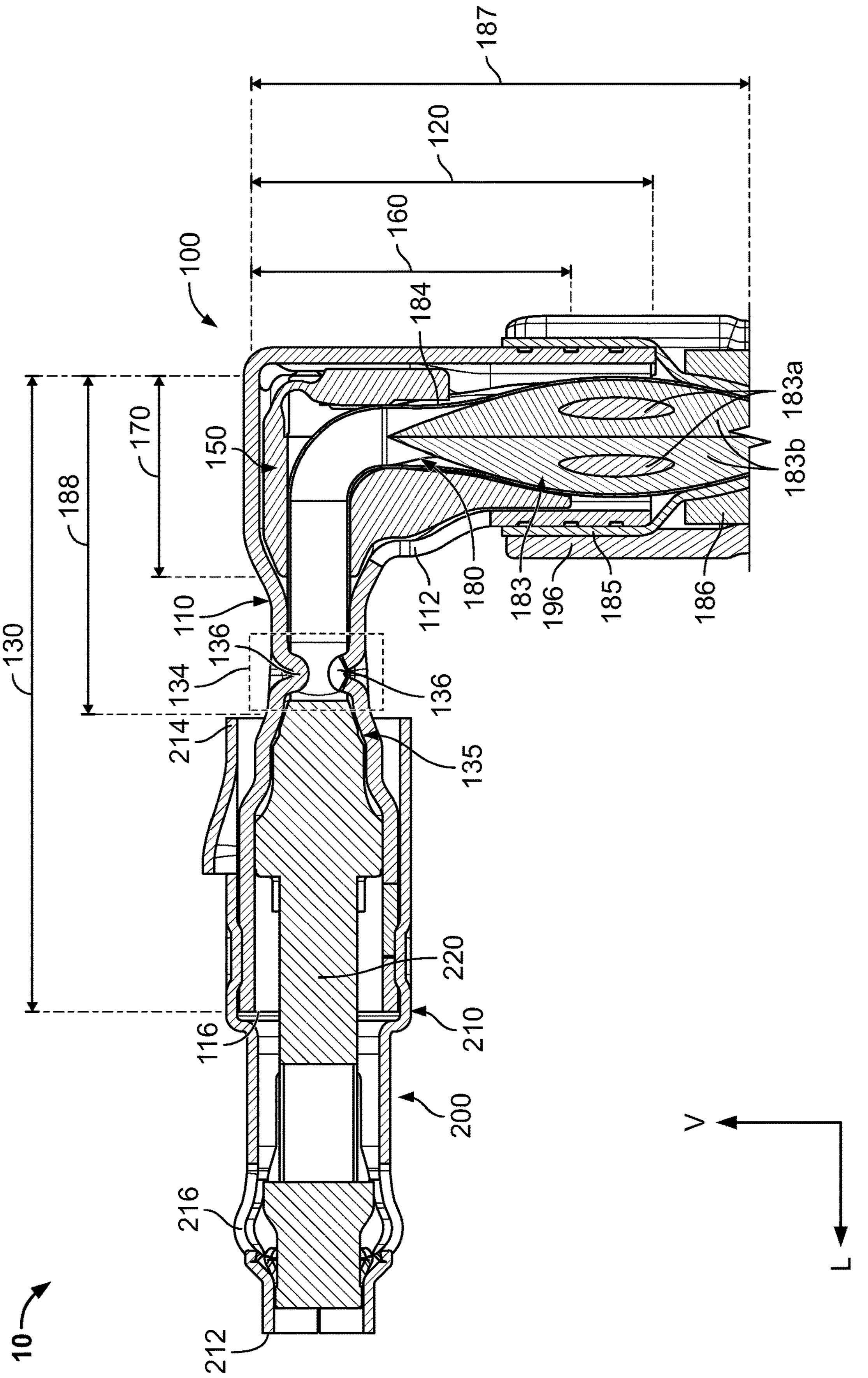
FIG. 5 is a sectional side view of the angled connector.

In the second shield section 130, as shown in FIG. 5, the angled shield 110 has a narrowed portion 134 in which a dimension of an interior space 135 of the second shield section 130 is decreased along the vertical direction V. In the shown embodiment, the narrowed portion 134 is formed by a pair of protrusions 136, as shown in FIGS. 1, 3, and 5, extending into the interior space 135 of the second shield section 130 opposite one another in the vertical direction V. In another embodiment, the narrowed portion 134 can be formed by one protrusion 136 extending in the vertical direction V, or could be formed by any other bend or element of the shield body 112 that can decrease the dimension of the interior space 135. A dimension of the narrowed portion 134 along the longitudinal direction L shown in FIG. 3 is merely exemplary; in other embodiments in which the second shield section 130 has a larger dimension along the longitudinal direction L, the narrowed portion 134 may also have a longer dimension along the longitudinal direction L.

The angled shield 110 is formed of a conductive material, such as aluminum, and in an embodiment is monolithically formed in a single piece with at least the shield body 112, the first section 120, the second section 130, and the shield cover 124. The angled shield 110 may be formed by stamping and bending from a sheet of conductive material. In other embodiments, the angled shield 110 may be formed from a plurality of separate elements attached together.

The angled dielectric 150, as shown in FIG. 2, has a dielectric body 152 extending from a first end 154 to an opposite second end 156. The angled dielectric 150 has a first dielectric section 160 and a second dielectric section 170 extending from the first dielectric section 160.

The first dielectric section 160, as shown in FIG. 2, extends from the first end 154 of the dielectric body 152. The first dielectric section 160 has a first dielectric axis 162 extending centrally through the first dielectric section 160. In the shown embodiment, the first dielectric axis 162 extends along the vertical direction V.

The second dielectric section 170 extends from the first dielectric section 160 to the second end 156 of the dielectric body 152, as shown in FIG. 2. The second dielectric section 170 has a second dielectric axis 172 extending centrally through the second dielectric section 170. In the shown embodiment, the second dielectric axis 172 extends along the longitudinal direction L.

As shown in FIG. 2, due to the direction of extension of the second dielectric axis 172 with respect to the first dielectric axis 162, the second dielectric section 170 extends at the bend angle 140 with respect to the first dielectric section 160. The bend angle 140 of the second dielectric section 170 with respect to the first dielectric section 160 is the same as the bend angle 140 of the second shield section 130 with respect to the first shield section 120; the bend angle 140 of the second dielectric section 170 with respect to the first dielectric section 160 is greater than or equal to 90° and less than 180°.

In the first dielectric section 160, as shown in FIG. 2, the angled dielectric 150 has a dielectric cover 164 attached to the dielectric body 152 at a dielectric hinge 168. The dielectric cover 164 is pivotable with respect to the dielectric body 152 about the dielectric hinge 168 between an open dielectric position DO, shown in FIGS. 2 and 4B, and a closed dielectric position DC, shown in FIG. 4C.

Figures 4A, 4B, 4C:
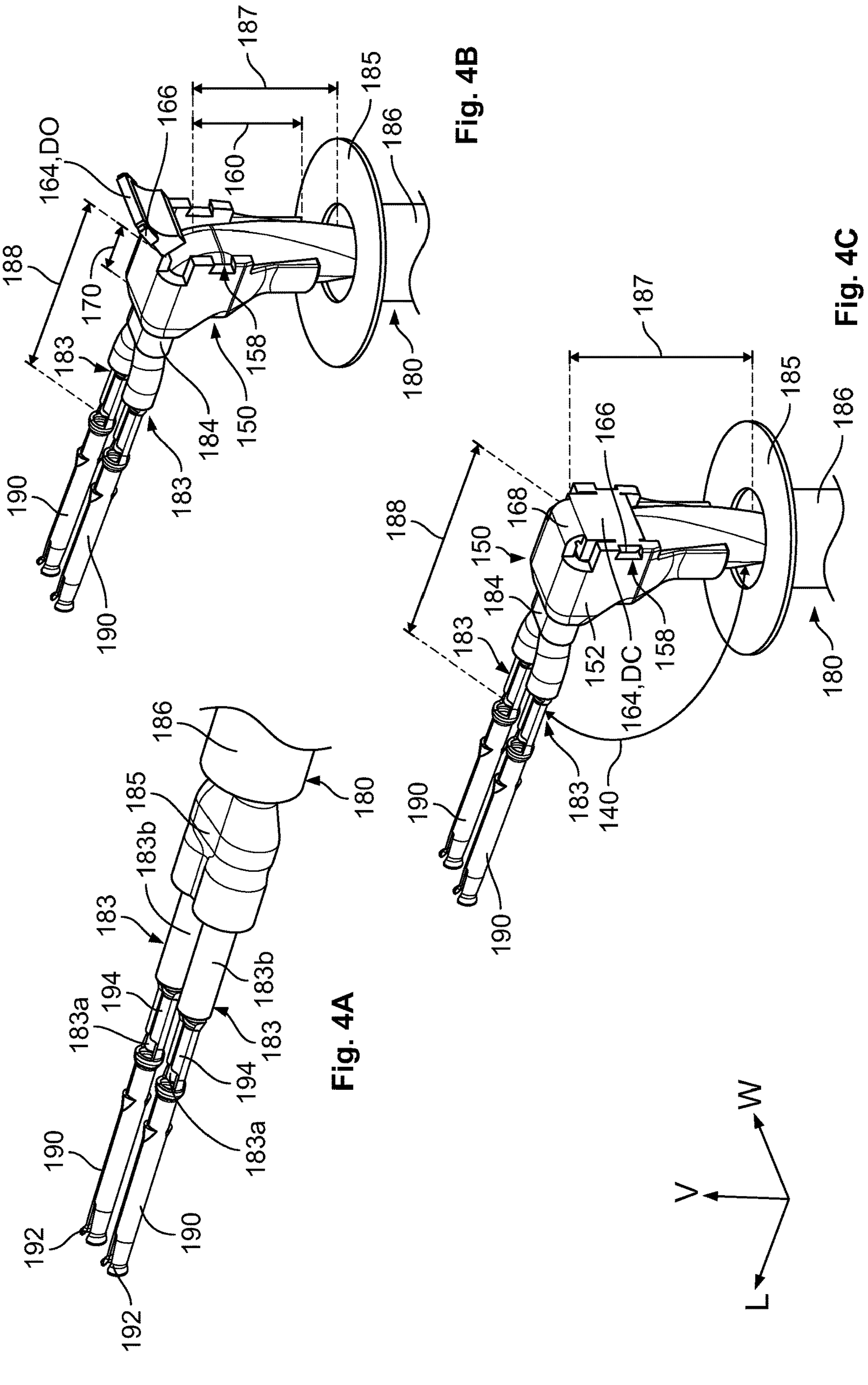
FIG. 4A is a perspective view of a cable of the angled connector connected to contacts of the angled connector.
FIG. 4B is a perspective view of the cable and an angled dielectric of the angled connector with a dielectric cover of the angled dielectric in an open dielectric position.
FIG. 4C is a perspective view of the cable and the angled dielectric with the dielectric cover in a closed dielectric position.

In the embodiment shown in FIGS. 2, 4B, and 4C, the dielectric body 152 has a catch 158 in the first dielectric section 160 and the dielectric cover 164 has a latch 166. When the dielectric cover 164 is pivoted into the closed dielectric position DC, the latch 166 engages with the catch 158 and secures the dielectric cover 164 in the closed dielectric position DC. In the shown embodiment, the catch 158 is a recess and the latch 166 is a protrusion complementary to the recess of the catch 158. In other embodiments, the catch 158 may be a protrusion and the latch 166 may be a recess complementary to the protrusion of the catch 158, or the catch 158 and the latch 166 may be any other elements capable of engaging with one another to secure the dielectric cover 164 in the closed dielectric position DC. In another embodiment, the catch 158 and the latch 166 may be omitted.

The angled dielectric 150 is a dielectric material, such as a plastic, and in an embodiment is monolithically formed in a single piece with at least the dielectric body 152, the first dielectric section 160, the second dielectric section 170, and the dielectric cover 164; in this embodiment, the dielectric hinge 168 is a film hinge. In other embodiments, the angled dielectric 150 may be formed from a plurality of separate elements attached together.

The cable 180, as shown in FIG. 2, has a wire 183, a foil 184 disposed around the wire 183, a braid 185 disposed around the foil 184, and a cable insulation 186 disposed around the braid 185.

In the shown embodiment, the cable 180 includes a twisted pair of wires 183, with each of the wires 183 having a conductor **183*a* and a wire insulation 183*b* disposed around the conductor 183*a*. In the twisted pair embodiment, the wires 183 are twisted around one another within the foil 184 with the wire insulation 183*b* of each of the wires 183 in abutment with one another. In another embodiment, the cable 180 includes a pair of wires 183 extending parallel to one another, each of the wires 183 having the conductor 183*a* and the wire insulation 183*b*. In another embodiment, the cable 180 may have one wire 183 with one conductor 183*a* surrounded by one wire insulation 183*b***.

The foil 184 is disposed around the wires 183 or wire 183 in abutment with the wire insulation **183*b*, as shown in FIG. 2. The foil 184 is formed of a conductive material. The braid 185 is disposed around and in abutment with the foil 184; the braid 185 is formed of a conductive material. The cable insulation 186, formed of an insulative material, is disposed around and in abutment with the braid 185**.

The contact 190, as shown in FIG. 2, has a mating portion 192 and a connection portion 194 at an end opposite the mating portion 192. The contact 190 is formed of a conductive material. In the shown embodiment, the mating portion 192 is a receptacle for a pin; in other embodiments, the mating portion 192 could be a pin or any other type of contact element capable of mating with another contact element. In the shown embodiment, the connection portion 194 is a crimping portion capable of being crimped to a conductor. In other embodiments, the connection portion 194 could be a flat element capable of being welded to a conductor, or any other type of element capable of mechanically and electrically connecting the contact 190 to a conductor. The angled subassembly 100 has two contacts 190 in the shown embodiment. The number of contacts 190 corresponds to the number of wires 183 of the cable 180; the angled subassembly 100 may alternatively have one contact 190 for an embodiment of the cable 180 having one wire 183.

The ferrule 196, as shown in the embodiment of FIGS. 1 and 2, is an approximately cylindrical element formed of a conductive material. In an embodiment, the ferrule 196 is formed from bending or rolling a sheet of conductive material.

Figure 6:
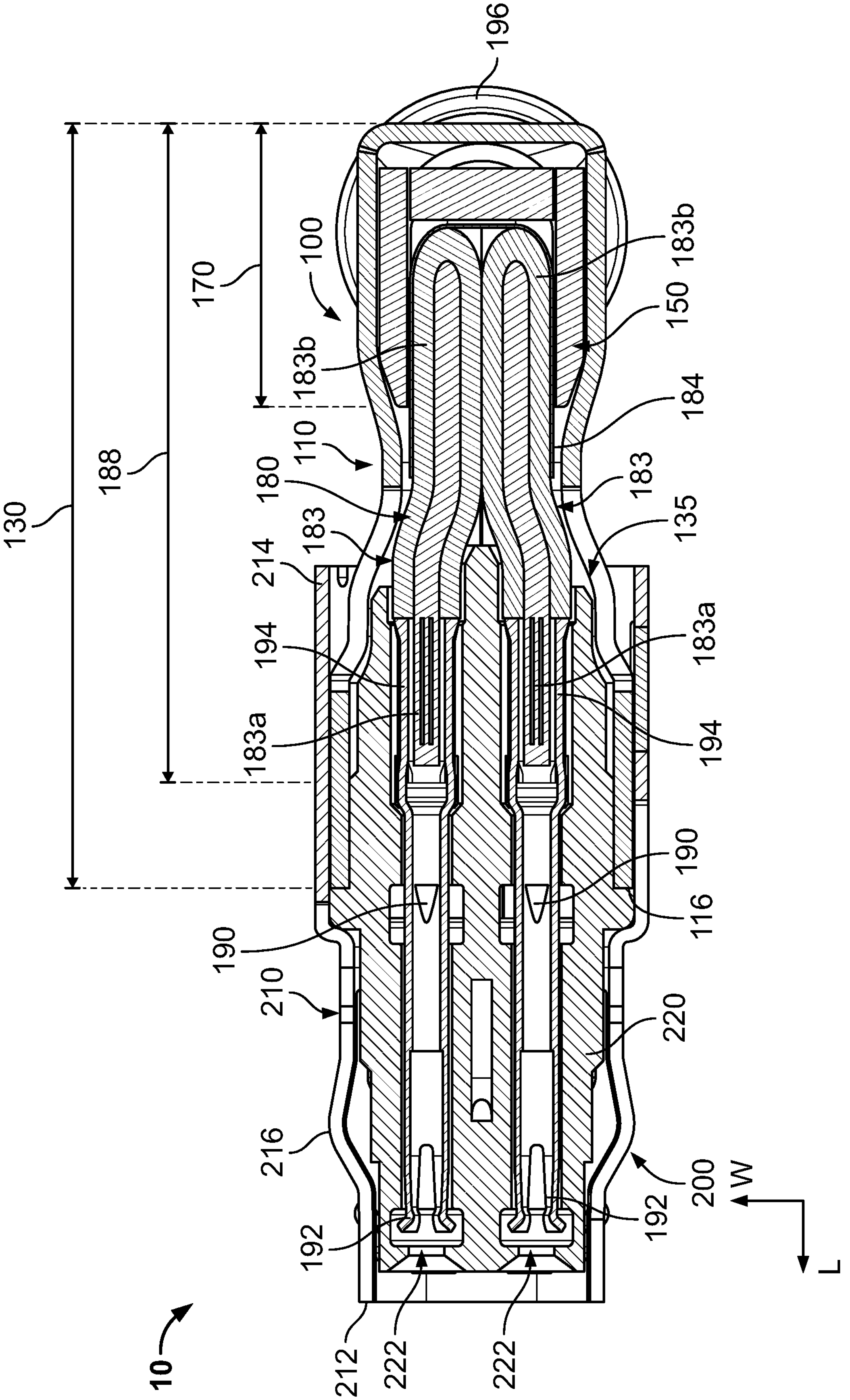
FIG. 6 is a sectional top view of the angled connector.

The mating subassembly 200, as shown in FIGS. 1 and 2, includes a mating shield 210 and a mating dielectric 220 disposed within the mating shield 210. The mating shield 210, formed of a conductive material, extends from a first end 212 to an opposite second end 214 along the longitudinal direction L. The mating shield 210 has a plurality of contact springs 216 disposed adjacent to the first end 212. In an embodiment, the mating shield 210 is monolithically formed in a single piece. The mating dielectric 220 is formed of a dielectric material and, as shown in FIG. 6, has a plurality of contact receiving passageways 222 extending through the mating dielectric 220 along the longitudinal direction L. The mating dielectric 220 can alternatively have one or more than two contact receiving passageways 222; the number of contact receiving passageways 222 corresponds to the number of wires 183 of the cable 180 and the number of contacts 190.

The assembly of the angled connector 10 will now be described primarily with respect to FIGS. 4A-4F.

In a first step, shown in FIG. 4A, the cable insulation 186, the braid 185, and the foil 184 are stripped to expose the wires 183. For each of the wires 183, a portion of the wire insulation **183*b* is stripped to expose a portion of the conductor 183*a*. The connection portion 194 of each of the contacts 190 is electrically and mechanically connected to one of the exposed conductors 183*a*. In the embodiment shown in FIG. 4A, the connections portions 194 are crimped to the conductors 183*a***.

In a next step, shown in FIG. 4B, the cable 180 is inserted into and through the angled dielectric 150 with the dielectric cover 164 in the open dielectric position DO. The cable 180 is bent within the angled dielectric 150 as shown in FIGS. 2 and 4B. When the cable 180 is bent, the cable 180 has a first portion 187 and a second portion 188 extending at the bend angle 140 with respect to the first portion 187, as shown in FIG. 4C. The first portion 187 is disposed in the first dielectric section 160 and the second portion 188 is disposed in the second dielectric section 170. As shown in FIG. 4B, the wires 183 and the foil 184 of the cable 180 extend through the angled dielectric 150.

With the cable 180 fully inserted through the angled dielectric 150 and bent into the shape described above and shown in FIGS. 2 and 4B, the dielectric cover 164 is moved from the open dielectric position DO to the closed dielectric position DC shown in FIG. 4C. In an embodiment, the catch 158 engages the latch 166 to secure the dielectric cover 164 in the closed dielectric position DC. In another embodiment, in lieu of or in addition to the catch 158 and the latch 166, the dielectric cover 164 is secured to the dielectric body 152 in the closed dielectric position DC by plastic welding of the dielectric cover 164 to the dielectric body 152. In another embodiment, the angled dielectric 150 does not have the dielectric cover 164 pivotable with respect to the dielectric body 152, but rather is overmolded in a single piece over the foil 184 of the cable 180 in the position shown in FIG. 4C.

The angled dielectric 150 in the position shown in FIG. 4C, due to the structure and the bend angle 140 of the first dielectric section 160 with respect to the second dielectric section 170 shown in FIGS. 2 and 4B, secures the cable 180 in the position shown in FIG. 4C with the first portion 187 at the same bend angle 140 with respect to the second portion 188. In the shown embodiment, the cable 180 is inserted into the angled dielectric 150 to be bent and held with the contacts 190 already connected to the wires 183. In another embodiment, the cable 180 can be inserted into the angled dielectric 150, bent, and held by the angled dielectric 150 prior to connecting the contacts 190 with the wires 183.

In an embodiment shown in FIG. 4D, the cable 180 bent and held by the angled dielectric 150 is inserted into the angled shield 110 with the shield cover 124 in the open shield position SO. In the position shown in FIG. 4D, the braid 185 is flared outwards from the cable 180.

The shield cover 124 is then moved from the open shield position SO shown in FIG. 4D to the closed shield position SC shown in FIG. 4E, enclosing the cable 180 in the shield body 112. In the shown embodiment, the tab 123 is disposed in the recess 126 to secure the shield cover 124 in the closed shield position SC. In an embodiment, the shield cover 124 can be crimped to the shield body 112 to retain the shield cover 124 in the closed shield position SC. In other embodiments, including the tab 123 and the recess 126 or omitting the tab 123 and the recess 126, and in addition to or in lieu of crimping the shield cover 124 to the shield body 112, the shield cover 124 can be welded to the shield body 112 to secure the shield cover 124 in the closed shield position SC.

With the shield cover 124 in the closed shield position SC shown in FIG. 4E, the braid 185 is dressed or folded over the first shield section 120 of the angled shield 110, as shown in FIG. 4F. The ferrule 196 is then positioned over the exposed portion of the braid 185 and a portion of the cable insulation 186 and crimped over the braid 185, the first shield section 120, and the cable insulation 186, as shown in FIGS. 1 and 5.

In the embodiment shown in FIGS. 4D-4F, the mating subassembly 200 is already connected to the angled shield 110 when the angled dielectric 150 and the cable 180 are inserted into the angled shield 110. As shown in FIGS. 5 and 6, the second end 116 of the angled shield 110 at the second shield section 130 is inserted into the second end 214 of the mating shield 210 and disposed in the mating shield 210. The angled shield 110 is mechanically and electrically connected to the mating shield 210 through the second shield section 130. The mating dielectric 220 is disposed within the interior space 135 of the second shield section 130, as shown in FIGS. 5 and 6. The mating dielectric 220 extends from a position adjacent to the narrowed portion 134 and out of the second shield section 130 along the longitudinal direction L. In another embodiment, the mating subassembly 200 can be connected to the angled shield 110 after the angled dielectric 150 and the cable 180 are inserted into the angled shield 110.

The angled connector 10 is shown in a fully assembled state in FIGS. 1, 5, and 6 in which the cable 180 is disposed and held within the angled shield 110 and the angled dielectric 150.

As shown in FIG. 5, the first portion 187 of the cable 180 is positioned in the first shield section 120 of the angled shield 110 and in the first dielectric section 160 of the angled dielectric 150. The foil 184 is disposed around the wires 183 in the first portion 187 and is held in abutment against the wire insulation 183*b* of the wires 183. The first shield section 120 mechanically and electrically contacts the foil 184 in the first portion 187 and is disposed between the foil 184 and the braid 185. The braid 185 in the first portion 187 is crimped to the first shield section 120 by the ferrule 196 and is disposed between the first shield section 120 and the ferrule 196; in an embodiment, the first shield section 120 provides a support for crimping of the ferrule 196 around the braid 185 and the cable 180 that prevents the crimping of the ferrule 196 from damaging the foil 194 or the wires 183.

The second portion 188 of the cable 180, as shown in FIGS. 5 and 6, is positioned in the second shield section 130 of the angled shield 110 and in the second dielectric section 170 of the angled dielectric 150. The foil 184 is disposed around the wires 183 in the second portion 188 and is held in abutment against the wire insulation 183*b* of the wires 183; the wires 183 and the foil 184 are each disposed in the first portion 187 and the second portion 188 of the cable 180.

In the second portion 188, as shown in FIG. 5, the wire insulation 183*b* of the wires 183 is disposed in the narrowed portion 134 of the angled shield 110. In an embodiment, the narrowed portion 134 is smaller in the vertical direction V than an outer diameter of the wires 183 and the cable 180 and the foil 134 are held in the second shield section 130 by an interference fit between the second portion 188 of the cable 180 and the narrowed portion 134. The foil 134 terminates to the angled shield 110 at the narrowed portion 134. In the shown embodiment, the protrusions 136 abut the wire insulation 183*b* to secure the wires 183 in the angled shield 110.

As shown in FIG. 6, each of the contacts 190 is positioned and held in one of the contact receiving passageways 222 of the mating dielectric 220. The conductors 183*a* of the wires 183 electrically and mechanically connected to the connection portions 194 of the contacts 190 are disposed within the mating dielectric 220 and the mating portions 192 of the contact 190 opposite the connection portions 194 are disposed adjacent to the first end 212 of the mating shield 210.

In the fully assembled state shown in FIGS. 1, 5, and 6, the foil 184 of the cable 180, the angled shield 110, the braid 185, the ferrule 196, and the mating shield 210 are electrically connected. The conductors 183*a* of the wires 183 are electrically connected to the contacts 190 and are electrically isolated from the foil 184, the angled shield 110, the braid 185, and the mating shield 210 by the wire insulations 183*b* and the mating dielectric 220. When the angled connector 10 is connected with a mating connector, the contact springs 216 of the mating shield 210 resiliently abut and electrically connect with a shield of the mating connector, and the contacts 190 mate and electrically connect with contacts of the mating connector.

In the angled connector 10, the cable 180 extends through a bend with the first portion 187 held at the bend angle 140 with respect to the second portion 188 by the angled shield 110 and the angled dielectric 150. By having the bend in the cable 180 itself, the foil 184 can remain over a longer portion of the cable 180 in the angled connector 10, allowing for a high degree of impedance control and improved shielding performance. The foil 184 extending over a large portion of the cable 180 and through the bend also avoids the crimping of the ferrule 196 having a significant impact on the impedance control; the ferrule 196 can be crimped as tight as necessary for mechanical robustness and, as described above, can bear on the first shield section 120 instead of potentially damaging the foil 184. Simple designs of the contact 190 can be used with the angled connector 10, saving on component cost and decreasing the complexity of assembly.

In the shown embodiment, the angled dielectric 150 maintains a tight fit of the wire or wires 183 within the angled shield 110 and a tight wrap of the foil 184 around the wires 183 in the first portion 187 and the second portion 188. In another embodiment, the angled dielectric 150 can be omitted. In an embodiment omitting the angled dielectric 150, the other elements of the angled connector 10 are still arranged as described above; the cable 180 extends through the angled shield 110 with the first portion 187 and the second portion 188 still at the bend angle 140, and the narrowed portion 134 of the second shield section 130 is relied upon to maintain the tightness of the wires 183 with each other and the tight wrap of the foil 184.

The angled connector 10 in the shown embodiment holds the first portion 187 of the cable 180 with respect to the second portion 188 of the cable 180 on the opposite side of the bend at the bend angle 140 of 90°. In other embodiments, the bend angle 140 can be any angle greater than 90° and less than 180°. The cable 180 in the shown embodiment also has a particular rotational position with respect to the contacts 190 about a rotational axis of the longitudinal direction L. The angled connector 10 is not limited to the rotational position of the shown embodiment, and the cable 180 could be arranged and held by the angled subassembly 100 at any rotational position about the longitudinal axis L with respect to the contacts 190.

What is claimed is:

1. An angled subassembly of an angled connector, comprising:

an angled shield having a first shield section and a second shield section extending at a bend angle with respect to the first shield section; and a cable disposed in the angled shield, the cable having a first portion positioned in the first shield section and a second portion positioned in the second shield section, the second portion extending at the bend angle with respect to the first portion, the angled shield has a shield body and a shield cover, the shield cover is pivotable with respect to the shield body between an open shield position in which the cable is insertable into the shield body and a closed shield position enclosing the cable in the shield body, the shield body is attached to the shield cover in the open shield position and in the closed shield position.

2. The angled subassembly of claim 1, wherein the cable has a wire and a foil disposed around the wire, the wire and the foil are each disposed in the first portion and in the second portion of the cable.

3. The angled subassembly of claim 2, wherein the wire has a conductor disposed within a wire insulation, the foil abuts the wire insulation in the first portion and in the second portion of the cable.

4. The angled subassembly of claim 2, wherein the wire is one of a pair of wires disposed within the foil.

5. The angled subassembly of claim 2, wherein the foil is electrically connected to the angled shield.

6. The angled subassembly of claim 2, further comprising a ferrule disposed around the cable and the first shield section.

7. The angled subassembly of claim 6, wherein the first shield section is disposed between the ferrule and the foil.

8. The angled subassembly of claim 7, wherein the cable has a braid disposed around the foil, the braid is disposed between the first shield section and the ferrule.

9. The angled subassembly of claim 2, further comprising an angled dielectric disposed within the angled shield, the wire and the foil of the cable extend through the angled dielectric.

10. The angled subassembly of claim 9, wherein the angled dielectric has a first dielectric section and a second dielectric section extending at the bend angle with respect to the first dielectric section, the first portion of the cable is disposed in the first dielectric section and the second portion of the cable is disposed in the second dielectric section.

11. The angled subassembly of claim 10, wherein the angled dielectric has a dielectric body and a dielectric cover attached to the dielectric body, the dielectric cover is pivotable with respect to the dielectric body between an open dielectric position in which the cable is insertable into the dielectric body and a closed dielectric position securing the cable in the dielectric body.

12. The angled subassembly of claim 1, wherein the angled shield has a narrowed portion in the second shield section, the narrowed portion has an interference fit with the second portion of the cable.

13. The angled subassembly of claim 1, wherein the bend angle is greater than or equal to 90° and less than 180°.

14. An angled connector, comprising:

an angled subassembly including an angled shield and a cable disposed in the angled shield, the angled shield having a first shield section and a second shield section extending at a bend angle with respect to the first shield section, the cable having a first portion positioned in the first shield section and a second portion positioned in the second shield section, the second portion extending at the bend angle with respect to the first portion, the angled shield has a shield body and a shield cover, the shield cover is pivotable with respect to the shield body between an open shield position in which the cable is insertable into the shield body and a closed shield position enclosing the cable in the shield body, the shield body is attached to the shield cover in the open shield position and in the closed shield position; and a mating subassembly connected to the angled subassembly.

15. The angled connector of claim 14, wherein the mating subassembly has a mating shield electrically connected to the angled shield.

16. The angled connector of claim 15, wherein the mating subassembly has a mating dielectric disposed within the mating shield, the angled subassembly has a contact electrically connected to the cable and disposed within the mating dielectric.

17. A method of assembling an angled subassembly of a connector, comprising:

providing an angled shield having a first shield section and a second shield section extending at a bend angle with respect to the first shield section; and inserting a cable into and through the angled shield, the cable having a first portion positioned in the first shield section and a second portion positioned in the second shield section, the second portion extending at the bend angle with respect to the first portion, the angled shield has a shield body and a shield cover, the shield cover is pivotable with respect to the shield body between an open shield position in which the cable is inserted into the shield body and a closed shield position enclosing the cable in the shield body, the shield body is attached to the shield cover in the open shield position and in the closed shield position.

18. The method of claim 17, wherein the cable has a wire and a foil disposed around the wire, the wire and the foil are each disposed in the first portion and in the second portion of the cable.

19. The method of claim 18, wherein the cable has a braid disposed around the foil, and further comprising crimping a ferrule around the braid and the first shield section.

* * * * *